March 19, 1929.  H. T. WOOLSON  1,705,630
BEARING
Filed June 25, 1928
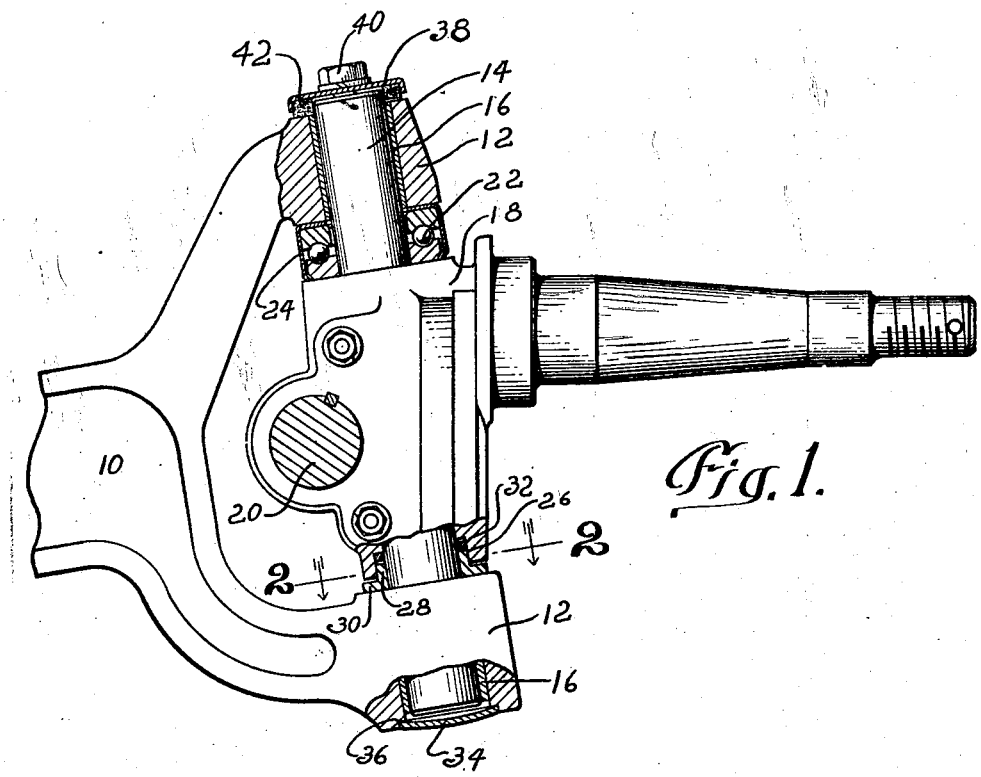
Fig.1.
Fig.2.
Fig.3.
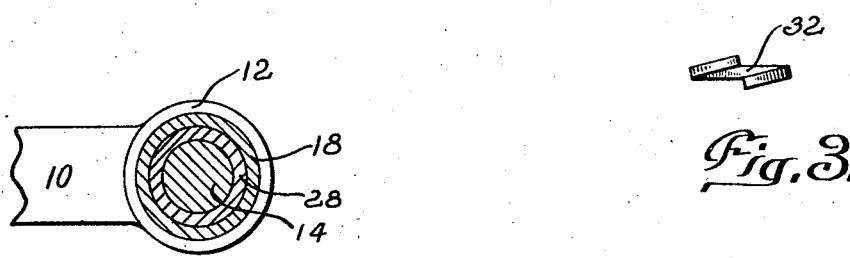
INVENTOR
HARRY T. WOOLSON.
BY
ATTORNEY

Patented Mar. 19, 1929.

1,705,630

UNITED STATES PATENT OFFICE.

HARRY T. WOOLSON, OF DETROIT, MICHIGAN, ASSIGNOR TO CHRYSLER CORPORATION, OF DETROIT, MICHIGAN, A CORPORATION OF DELAWARE.

BEARING.

Application filed June 25, 1928. Serial No. 288,119.

This invention relates to a bearing and more particularly to a bearing seal for the front axle spindle of an automobile.

An object of the invention is to provide an axially movable bearing member between the bearing members of a yoke and to resiliently urge the movable member in the direction of the load so that the opposite ends of the member between the yoke are at all times in engagement with the inner faces of the yoke bearings.

Another object of the invention is to provide a flanged bearing in the lower end of an axle spindle, axially movable within the spindle on the king pin.

Other objects and advantages of the invention will more fully appear from the following description taken in connection with the accompanying drawings, in which:

Fig. 1 is a side elevation of one end of a front axle for an automobile, parts being broken away, and in section.

Fig. 2 is a sectional view of line 2—2 of Fig. 1.

Fig. 3 is a view of a resilient member used between the axle spindle and the axially movable bearing member.

Referring to the drawings, I have shown a portion of a front axle 10 provided with yoke ends 12 adapted to receive and form bearings for a king pin 14. Bushings 16 are provided in the yoke ends. In the particular form illustrated, a spindle 18 is secured to the king pin 14 between the yoke ends 12. A steering arm 20 is secured to the spindle to pivot the spindle and king pin in the bearings 16.

Between the upper surface of the spindle and the lower surface of the upper yoke 12, I have provided a thrust bearing 22. A cap 24 is positioned between the bearing 22 and the upper yoke extending downwardly enclosing the bearing 22 with its lower surface in engagement with the upper surface of the spindle. It will be understood that such a construction provides a closure for the upper portion of the bearing preventing water or dirt from entering and thereby preventing wear.

The load on the axle is in a downward direction constantly urging the lower surface of the upper yoke toward the upper surface of the spindle. When the parts become worn the lower surface of the spindle retracts from the upper surface of the lower yoke. In constructions heretofore used a space between the lower end of the spindle and the lower yoke resulted through which water and dirt found its way to the king pin and its bearings.

In the present construction, I have provided a bore 26 in the lower end of the spindle which receives a bushing 28 having a flange 30. Between the inner end of the bushing 28 and the bottom of the bore, I have provided a resilient member 32 shown as a split steel spring washer. It will be understood that the resilient member 32 urges the bushing toward the upper surface of the lower yoke and that a seal is constantly maintained between the spindle and yoke regardless of wear on the parts. There is practically no weight on the bearing portion of the bushing 28 in the bore 26 which provides a sliding fit seal between the bushing and the spindle.

The lower yoke opening which receives one end of the king pin 14 is closed by a metallic disc 34 pressed into a bore 36. The upper end of the king pin is provided with a cap 38 held in position by a bolt 40. The cap 38 extends radially over the upper surface of the upper yoke and a packing 42 is provided between the cap and the yoke to seal the upper yoke bearing against the entrance of water or dirt.

It will be understood that by the arrangement of parts in the form of my device described, a construction has been provided which is sealed at every broken surface and that the seal is maintained regardless of the wear of the parts.

While I have described what I deem to be the preferred embodiment of my invention it will be obvious that various changes including the size and arrangement of parts may be made without departing from the spirit of my invention and it is not my intention to limit its scope other than by the terms of the appended claims.

What I claim is:

1. A bearing of the class described comprising a pair of axially aligned bearing members, a pivoted member between said bearing members provided with oppositely extending projections received in said bearing members, a bushing slidably mounted in one end of said pivoted member adapted for engagement with one of said bearing members, and resilient means between said pivoted member and said bushing.

2. A device of the class described comprising, oppositely spaced bearing members, a pin supported in said bearing members and extending from one to the other, a pivoted member between said bearing members and carried by said pin, a member slideably mounted on said pin and partially within said pivoted member, and resilient means between said slideable member and said pivoted member for separating said members.

3. A device of the class described comprising, a front axle shaft yoke, a king pin journaled in the yoke ends of said axle, a spindle secured to said pin between said yoke ends, a thrust bearing between the upper surface of said spindle and the adjacent bearing of the yoke, a bushing slideably mounted in the opposite end of said spindle adapted for engagement with the lower end of the yoke, and resilient means between said bushing and said spindle.

4. A device of the class described comprising, a spindle journaled in the yoke of an axle shaft, an annular bore in the lower end of said spindle, a member having a portion adapted for a sliding fit in said bore, and a resilient member between the base of said bore and the inner end of said member adapted to urge said member out of said bore.

5. A device of the class described comprising, a front axle shaft yoke having axially aligned openings, a king pin journaled in said openings, a spindle carried by said king pin, a packing carried by the upper end of said king pin and in engagement with the upper surface of said yoke, a thrust bearing between the upper surface of said spindle and the lower surface of the upper yoke bearing, a cap enclosing said bearing having its opposite ends in engagement with the upper and lower faces of said spindle and said upper yoke bearing respectively, a closure for the lower surface of said yoke bearing, and means for forming a permanent seal between the upper surface of the lower yoke bearing and the lower surface of said spindle.

HARRY T. WOOLSON.